(12) United States Patent
Rajzer et al.

(10) Patent No.: US 11,689,124 B2
(45) Date of Patent: Jun. 27, 2023

(54) CONTROLLING BRUSHLESS MOTOR COMMUTATION

(71) Applicant: Snap-on Incorporated, Kenosha, WI (US)

(72) Inventors: Michael T. Rajzer, Kenosha, WI (US); Jason Genz, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 128 days.

(21) Appl. No.: 17/147,205

(22) Filed: Jan. 12, 2021

(65) Prior Publication Data

US 2022/0224258 A1 Jul. 14, 2022

(51) Int. Cl.
*H02P 6/12* (2006.01)
*B25F 5/02* (2006.01)
*B25B 21/00* (2006.01)

(52) U.S. Cl.
CPC ............. *H02P 6/12* (2013.01); *B25F 5/02* (2013.01); *B25B 21/004* (2013.01); *H02P 2205/03* (2013.01)

(58) Field of Classification Search
CPC ...... H02P 6/15; H02P 6/14; H02P 6/34; H02P 29/0241; H02P 6/085; H02P 7/05; H02P 27/08; H02P 27/085; H02K 11/33; H02K 7/145; B25F 5/00
See application file for complete search history.

(56) References Cited

U.S. PATENT DOCUMENTS

| | | |
|---|---|---|
| 3,732,472 A | 5/1973 | Favre |
| 4,270,074 A | 5/1981 | Duckworth et al. |
| 4,303,871 A | 12/1981 | Berry |
| 5,136,220 A | 8/1992 | Philipp |
| 5,235,261 A | 8/1993 | Philipp |
| 5,268,622 A | 12/1993 | Philipp |
| 5,793,169 A | 8/1998 | DeFilippis et al. |
| 6,452,349 B1 | 9/2002 | Hahn et al. |
| 6,479,958 B1 | 11/2002 | Huber et al. |
| 6,597,134 B2 | 7/2003 | Brenden et al. |
| 6,825,632 B2 | 11/2004 | Hahn et al. |

(Continued)

FOREIGN PATENT DOCUMENTS

| | | |
|---|---|---|
| CN | 105345715 | 2/2016 |
| CN | 105500264 | 4/2016 |

(Continued)

OTHER PUBLICATIONS

Combined Search and Examination Report for corresponding Application No. GB2200281.0 dated Jun. 20, 2022, 5 pages.

(Continued)

*Primary Examiner* — Said Bouziane

(74) *Attorney, Agent, or Firm* — Seyfarth Shaw LLP

(57) ABSTRACT

A computer implemented method for controlling commutation of a brushless DC (BLDC) motor. The method includes controlling a switching array to drive the BLDC motor at a first commutation, receiving and monitoring power consumption signals indicating power consumption of the BLDC motor, determining whether the power consumption exceeds a first threshold value, and controlling the switching array to drive the BLDC motor at a second commutation when the power consumption exceeds the first threshold value.

29 Claims, 4 Drawing Sheets

(56) References Cited

U.S. PATENT DOCUMENTS

| | | |
|---|---|---|
| 6,992,448 B2 | 1/2006 | Chiaki et al. |
| 6,995,534 B2 | 2/2006 | Berroth et al. |
| 7,126,300 B2 | 10/2006 | Matsubara |
| 7,129,661 B2 | 10/2006 | Sugiura |
| 7,268,509 B2 | 9/2007 | Schmohl |
| 7,602,137 B2 | 10/2009 | Deshpande et al. |
| 7,671,551 B2 | 3/2010 | Peng et al. |
| 7,688,011 B2 | 3/2010 | Berroth et al. |
| 8,102,133 B2 | 1/2012 | Yang et al. |
| 8,405,332 B1 | 3/2013 | Krishnamoorthy et al. |
| 8,587,236 B2 | 11/2013 | Kenichi |
| 8,796,967 B2 | 8/2014 | Sato |
| 8,878,475 B2 | 11/2014 | Armaroli et al. |
| 9,073,186 B2 | 7/2015 | Kusakawa |
| 9,114,519 B2 | 8/2015 | Iwata et al. |
| 9,154,009 B2 | 10/2015 | Alemu |
| 9,193,055 B2 | 11/2015 | Hester et al. |
| 9,197,146 B2 | 11/2015 | Mergener et al. |
| 9,314,855 B2 | 4/2016 | Iwata et al. |
| 9,543,863 B1 | 1/2017 | Krishnamoorthy et al. |
| 9,647,585 B2 | 5/2017 | Mergener et al. |
| 9,908,182 B2 | 3/2018 | Ng et al. |
| 9,923,492 B2 | 3/2018 | Chen et al. |
| 9,950,417 B2 | 4/2018 | Hironori et al. |
| 10,183,384 B2 | 1/2019 | Iwata et al. |
| 10,566,924 B2 | 2/2020 | Haibo et al. |
| 10,710,220 B2 | 7/2020 | Cox et al. |
| 10,903,775 B2 | 1/2021 | Hosokawa |
| 2007/0024225 A1 | 2/2007 | Hahn et al. |
| 2008/0297084 A1 | 12/2008 | Berroth et al. |
| 2013/0314007 A1* | 11/2013 | Yanagihara ............... H02P 6/28 318/400.13 |
| 2013/0327552 A1 | 12/2013 | Murray et al. |
| 2015/0115864 A1 | 4/2015 | Matsuda et al. |
| 2015/0137727 A1 | 5/2015 | Furtani et al. |
| 2016/0111984 A1 | 4/2016 | Iwata et al. |
| 2020/0122224 A1 | 4/2020 | Wu |
| 2021/0119566 A1* | 4/2021 | Kumakura ............... B25F 5/00 |

FOREIGN PATENT DOCUMENTS

| | | |
|---|---|---|
| CN | 105666392 | 6/2016 |
| DE | 19629564 | 1/1998 |
| GB | 2485276 | 5/2012 |
| WO | 2013136672 | 9/2013 |
| WO | 2013143489 | 10/2013 |

OTHER PUBLICATIONS

Canadian Office Action for corresponding Application No. 3,144,747 dated Feb. 10, 2023, 5 pages.

* cited by examiner

CONTROLLING BRUSHLESS MOTOR COMMUTATION

TECHNICAL FIELD OF THE INVENTION

The present invention relates to commutation control of a brushless DC (BLDC) motor.

BACKGROUND OF THE INVENTION

Power tools, such as, for example, motorized ratchet wrenches, drills, and drivers, driven by brushless DC (BLDC) motors are commonly used in automotive, industrial, and household applications to tighten and untighten work pieces, such as threaded fasteners, and to apply a torque and/or angular displacement to a work piece, for example. BLDC motor commutation is typically implemented using a microcontroller or microprocessor computer. Controlling commutation with electronics and position feedback instead of brushes allows for greater flexibility and capabilities not available with conventional brushed DC motors, including precise speed control, position control, and stepped operation for slow and fine motion control.

Power tools have different load points based on the application they are used in. For example, a motor of a power tool runs at a high speed with low current, but as a fastener is tightened, the speed decreases and the current increases. While controller software can be customized to the specific motor being used for a specific application, motor controllers typically use only one type of commutation to control the motor without the ability to change to a different type of commutation. However, since the type of commutation can have a large impact on motor performance, such as no load speed, stall torque, efficiency, etc., being able to change between different types of commutation when under different load conditions allows the tool to be optimized to the desired performance.

SUMMARY OF THE INVENTION

The present invention relates broadly to a method of commutation control of a BLDC motor for use with, for example, a power tool. While the present invention is described as being used with a BLDC motor for a power tool, it will be appreciated that the present invention can be used with a BLDC motor for any purpose or function. In an embodiment, the method uses a controller to optimize commutation based on power consumption of the BLDC motor. In general, the power consumption of the BLDC motor changes based on the application for which the power tool is being used. By optimizing the commutation, tool performance, motor life, and/or motor efficiency can be improved, compared to controllers that only use one type of commutation.

In an embodiment, the present invention broadly comprises a computer implemented method for controlling commutation of a brushless DC motor. The method includes controlling a switching array to drive the BLDC motor at a first commutation, receiving and monitoring power consumption signals indicating power consumption of the BLDC motor, determining if the power consumption exceeds a first threshold value, and controlling the switching array to drive the BLDC motor at a second commutation if the power consumption exceeds the first threshold value.

In another embodiment, the present invention broadly comprises a power tool including a BLDC motor adapted to drive an output of the power tool, a switching array adapted to selectively apply power from a power source to the BLDC motor, and a controller adapted to control the switching array to drive the BLDC motor. The controller is adapted to control the switching array to drive the BLDC motor at a first commutation, receive and monitor power consumption signals indicating power consumption of the BLDC motor, determine if the power consumption exceeds a first threshold value, and control the switching array to drive the BLDC motor at a second commutation if the power consumption exceeds the first threshold value.

In another embodiment, the present invention broadly comprises a controller for controlling a switching array that selectively applies power from a power source to implement commutation of a brushless DC (BLDC) motor. The controller comprises a memory including non-transitory computer-readable instructions and a processor adapted to execute the non-transitory computer-readable instructions to cause the processor to control the switching array to drive the BLDC motor at a first commutation, receive and monitor power consumption signals indicating power consumption of the BLDC motor, determine whether the power consumption exceeds a first threshold value, and control the switching array to drive the BLDC motor at a second commutation when the power consumption exceeds the first threshold value.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
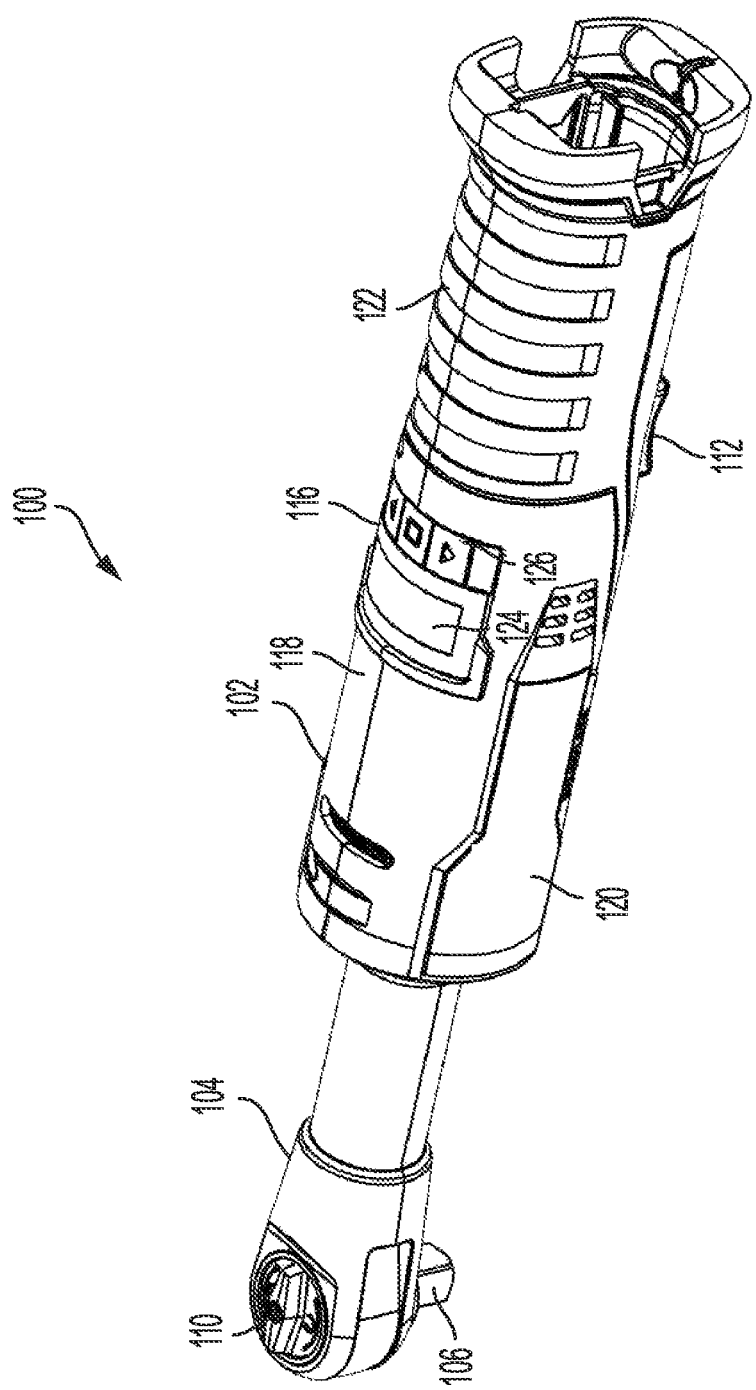
FIG. 1 is a perspective view of an exemplary power tool, such as a motorized ratchet tool, that includes a BLDC motor according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly relates to a method of commutation control of an electric brushless DC (BLDC)

motor. The BLDC motor can be used, for example, with a power tool. While the present invention is described as being used with a BLDC motor for a power tool, it will be appreciated that the present invention can be used with a BLDC motor for any purpose or function, including different tools or any type of BLDC motorized devices, such as in servo, actuation, positioning, and variable speed applications where motion control and stable operation are critical. In an embodiment, the method uses a controller to optimize commutation based on power consumption of the BLDC motor, such as, for example, current draw of the motor. The power consumption of the motor is used by the controller to determine what operating point the tool is in and changes the commutation accordingly.

Referring to FIGS. 1-4, an exemplar tool 100, such as, for example, a motorized hand held ratcheting tool, includes a housing portion 102 adapted to be held by a user and a driver portion 104 coupled to the housing portion 102. Again, while the present invention is described with use in a ratcheting tool, it will be appreciated that it can be used with any type of BLDC motor driven tool or device. The driver portion 104 is adapted to apply torque to a work piece and includes a drive lug 106 adapted to engage a tool (e.g., socket or bit) to drive the work piece, for example, in a well-known manner. The drive lug 106 is operatively coupled to and driven by an electric brushless DC (BLDC) motor 108 via a ratcheting mechanism (not shown) of the driver portion 104 in a well-known manner. The driver portion 104 also includes a selector knob 110 adapted to select a rotational drive direction of output 106, such as a drive lug (i.e., clockwise or counter-clockwise). For example, the driver portion 104 may be a ratchet head of a ratchet tool.

The housing portion 102 operably houses one or more of the BLDC motor 108 adapted to drive the output 106, a trigger 112 adapted to actuate the BLDC motor 108, a power source (not shown) adapted to provide electrical power for the BLDC motor, such as a battery, a controller 114 (described in more detail below), and a display assembly 116 (described in more detail below). In an embodiment, the housing portion 102 is assembled from two or more clamshell housing portions 118, 120 coupled together to cooperatively form the housing portion 102 and couple to the driver assembly 104, thereby enclosing the components, such as the BLDC motor 108 and the controller 114 within the housing portion 102. The housing portion 102 may also include a handle portion 122 that a user may grip or hold during operation of the tool 100.

The BLDC motor 108 can be operably coupled to the power source via the trigger 112 in a well-known manner. The power source can be external (e.g., an electrical wall outlet, generator, external battery, etc.) or internal (e.g., a removable and rechargeable battery). The trigger 112 can be adapted to cause the BLDC motor 108 to be turned ON and OFF, or cause electric power/voltage to flow from the power source to the BLDC motor 108 or cease flow from the power source to the BLDC motor 108.

The trigger 112 can be an actuation mechanism that employs a push button actuator or other type of actuator. For example, the user can depress the trigger 112 inwardly to selectively cause power to be drawn from the power source and cause a BLDC motor 108 to provide torque to the driver portion 104 in a desired rotational direction. Any suitable trigger 112 or switch can be implemented without departing from the spirit and scope of the present invention. For example, the trigger 112 can be a toggle actuator, a touch sensitive actuator, a slide actuator, or other suitable actuator or device. In another example, the trigger 112 can be biased such that the trigger 112 is inwardly depressible, relative to the housing portion 102, to cause the tool 100 to operate, and releasing the trigger 112 causes the trigger 112 to move outwardly, relative to the housing portion 102, to cease operation of the tool 100 via the biased nature of the trigger 112. The trigger 112 may also be a variable speed type mechanism. In this regard, relative actuation or depression of the trigger 112 causes the BLDC motor 108 to operate at variable speeds the further the trigger 112 is depressed.

The display assembly 116 includes a display 124 adapted to indicate tool information to the user. In an embodiment, the display 124 is an LCD. The tool information can include, for example, a tool status, such as, for example, a power level of the power source, a selected driving direction of the drive lug 106, a power state of the motor, battery charge or condition, output torque of the tool 100, etc. The display assembly 116 further includes one or more buttons 126 adapted to receive a user input, such as, for example, selecting what is displayable on the display 124, for selecting tool parameters, such as, for example, the driving direction of the output 106, and/or for otherwise manipulating the display 124 to control the tool 100 and/or parameters of the tool 100.

Figure 2:
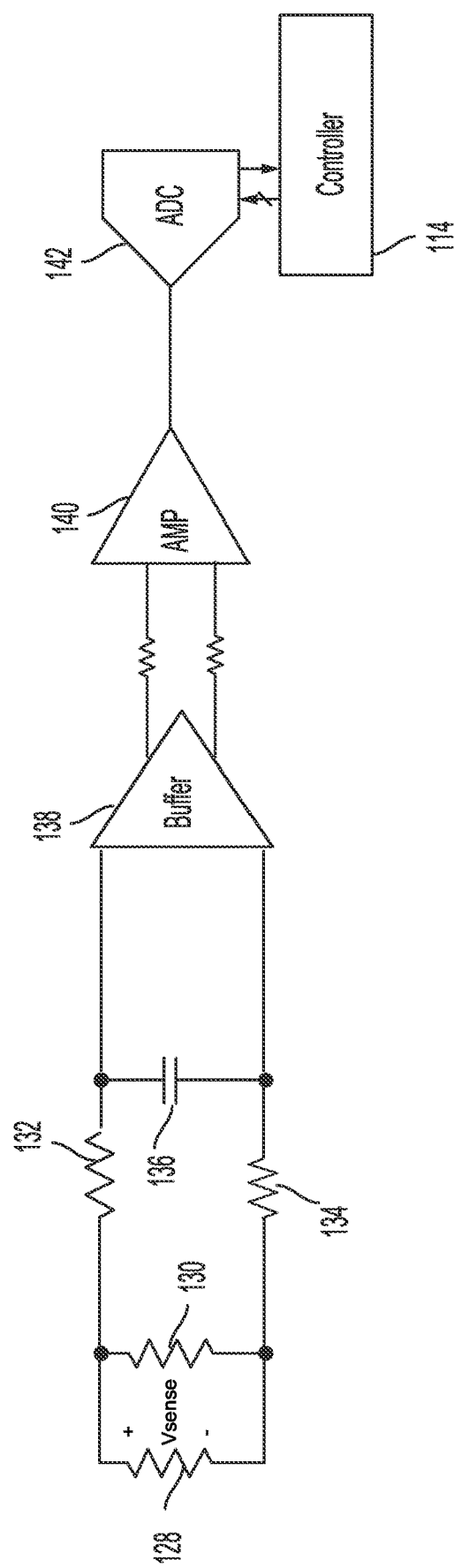
FIG. 2 is a block diagram conceptually illustrating exemplar electronic components adapted to sense motor current, which partly indicates power consumption and can be used to determine when to change commutation of an electric brushless motor, according to an embodiment of the present invention.

Power consumption, such as, for example current draw, of the BLDC motor 108 can be determined by the controller 114 utilizing, for example, the arrangement of electronic components illustrated in FIG. 2. However, the invention is not limited as such and any suitable arrangement of electronic components may be used to determined power consumption of the BLDC motor 108.

As illustrated in FIG. 2, resistors 128 and 130 receive current from the BLDC motor 108 and generate corresponding analog voltage Vsense due to current flowing therethrough. Resistors 132 and 134 and a capacitor 136, such as for example, a non-polarized capacitor, filter the analog voltage to reduce noise. The filtered analog voltage is received by a buffer 138 and amplified by an amplifier 140 according to a gain setting. The amplified analog voltage is converted to a digital value, such as, for example, a 10-bit digital value, by an analog-to-digital converter (ADC) 142. A controller 114 monitors and processes the digital value and optimizes commutation based on the digital value, which represents the current draw of the BLDC motor 108.

In an example, the controller 114 includes a processor, such as, for example, a central processing unit (CPU), for processing data and executing non-transitory computer-readable instructions using known methods. For example, the controller 114 retrieves the instructions from data storage via a bus, using a memory for runtime temporary storage of the instructions and data. The memory may include volatile and/or nonvolatile random access memory (RAM). The components may also be connected to other components in addition to (or instead of) being connected to other components via the bus. The controller 114 monitors, analyzes, and processes signals from the ADC 142 to optimize commutation based on power consumption, such as, for example, the current draw, of the BLDC motor 108.

Figure 3:
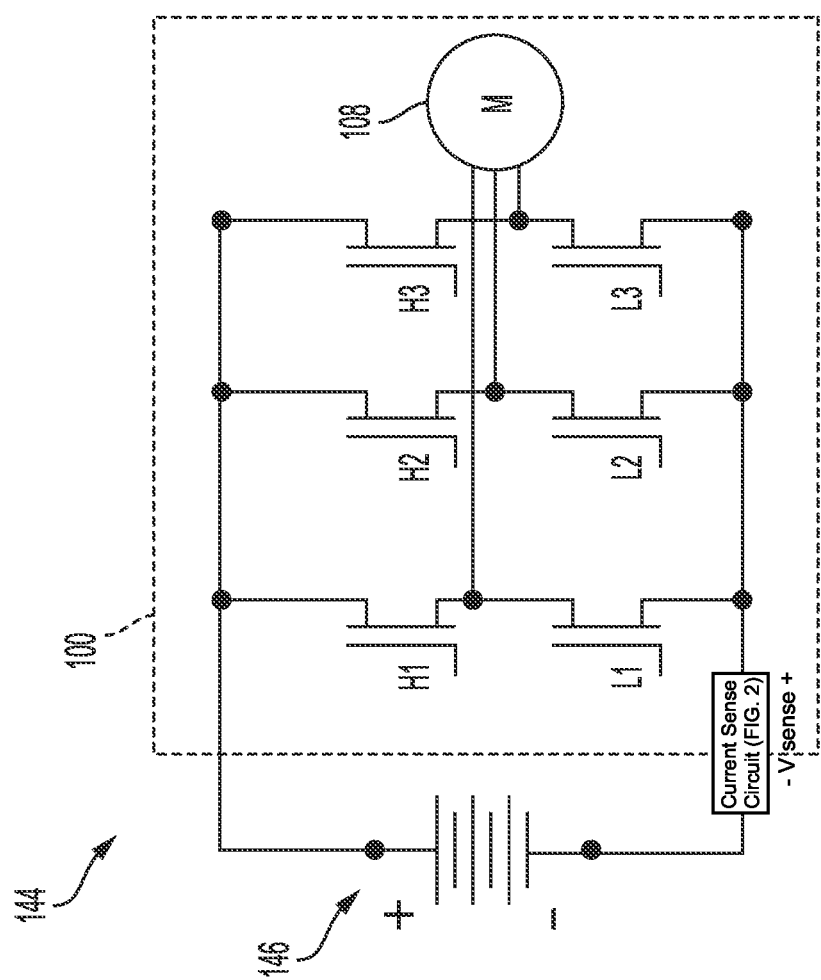
FIG. 3 is a schematic according to an embodiment of the present invention.

An example switching array 144 for the BLDC motor 108 of the power tool 100 is illustrated in FIG. 3. The switching array 144 includes three high-side switching elements, H1, H2, and H3, and three switching elements, L1, L2, and L3, each having a first or conducting state and a second or non-conducting state. The switching array 144 is controlled by the controller 114 to selectively apply power from a power source 146 (e.g., a battery pack) to the BLDC motor 108 to achieve desired commutation. By activating particular high side and low side switching elements, the brushless motor 108 is operated by having a controller send a current signal through coils located on a stationary part called a stator. The coils cause a magnetic force to be applied to a rotating part called a rotor when current runs through the coils. The rotor contains permanent magnets that interact with the magnetic forces caused by the windings of the stator. By activating successive combinations of high and low side switching elements in a particular order, thereby sending a particular order of current signals through the windings of the stator, the stator creates a rotating magnetic field which interacts with the rotor causing it to rotate and generate torque.

Figure 4:
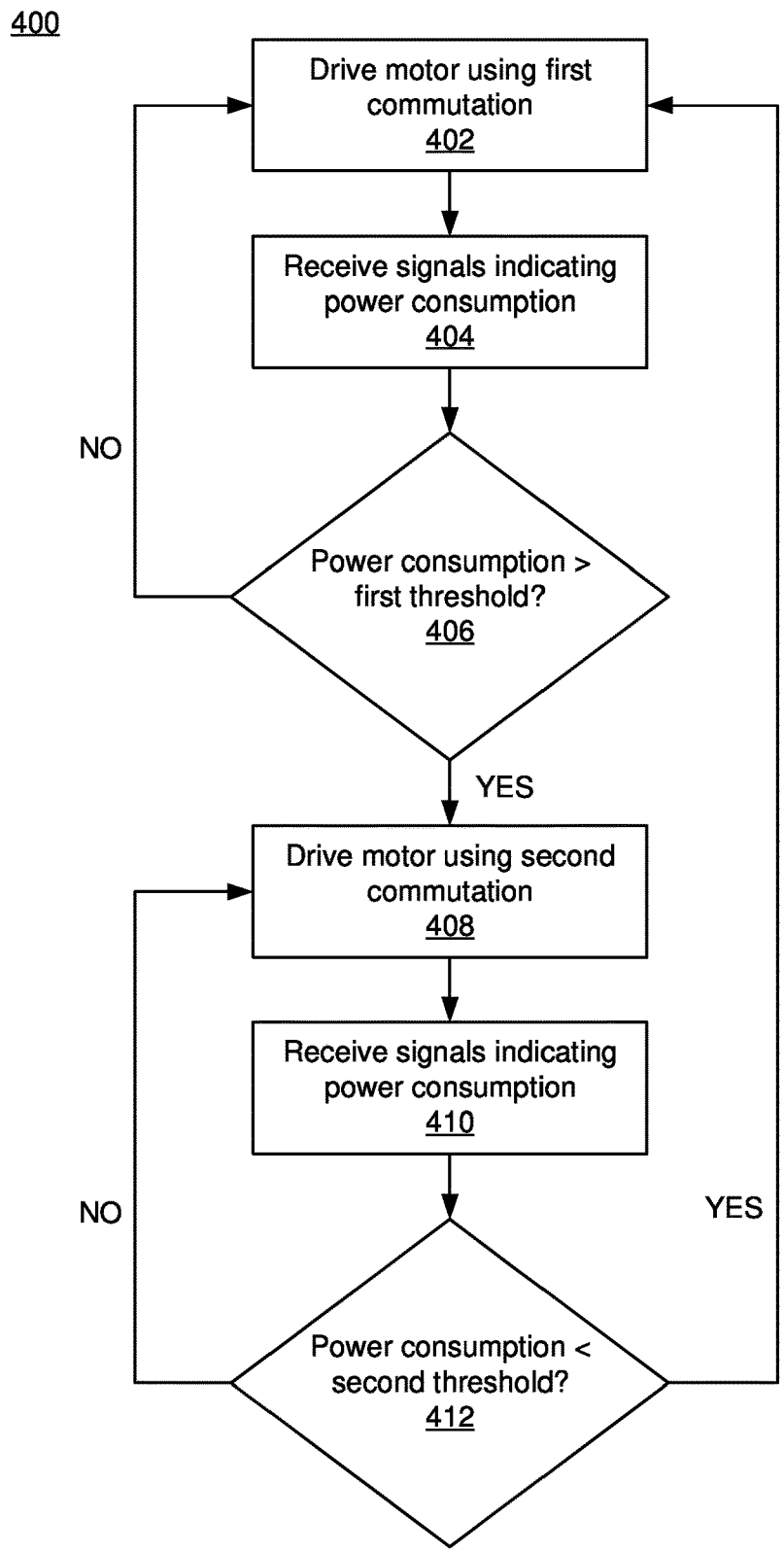
FIG. 4 is a flow chart illustrating an exemplary method of commutation control of a BLDC motor, according to an embodiment of the present invention.

FIG. 4 is a block flow diagram of an example method performed by a computing device, such as the controller 114, to control the switching array 144 to achieve desired commutation based on power consumption of the BLDC motor 108. For example, the controller 114 controls the switching array 144 to drive the motor 108 at a first commutation (402), such as, for example, a 6-step commutation. In this example, the controller changes which switching elements are activated when a new hall transition is detected to control the motor 108. In some cases, there is some phase advance or phase delay needed to adjust for hall sensor misalignment with regards to the magnets in the motor 108. For both phase advance and phase delay, the controller determines the previous time between hall signal changes (Time A). If phase advance is used, Time A is then used to set a new timer for a new amount of time (Time B) in the microcontroller. Time B is calculated to be a certain percentage less than Time A or an equivalent number of degrees (mechanical or electrical degrees) that is less than Time A. For example, the first commutation could be configured with Time B set to 20% less than Time A, which means that the next set of switching elements will be activated at Time B instead of at the next anticipated hall transition (Time A). If phase delay is used, Time A is used to set a new timer for a new amount of time (Time C) in the microcontroller. Time C is calculated to be a certain percentage more than Time A or an equivalent number of degrees (mechanical or electrical degrees) more than Time A. For example, the first commutation could be configured with Time C set to 20% more than Time A, which means that the next set of switching elements will be activated at Time C instead of at the previous hall transition. The controller 114 receives and monitors power consumption signals indicating power consumption of the BLDC motor 108, such as, for example, power, current, and/or voltage draw (404). The controller 114 determines whether the power consumption exceeds a first threshold value (406).

When the power consumption does not exceed (or is less than or equal to) the first threshold value, the method proceeds back to step 402, and the controller 114 continues to control the switching array to drive the motor at the first commutation (402).

When the power consumption exceeds the first threshold value, the controller 114 controls the switching array to drive the motor at a second commutation (408). In an embodiment, the second commutation is also a form of 6-step commutation, as described above. However, in the second commutation, phase advance is added, such as for example, 50%, which is equivalent to 15 mechanical degrees for a motor with 30 degrees of mechanical rotor movement in between hall transitions (60 electrical degrees). While driving the motor at the second commutation, the method continues to monitor power consumption signals indicating power consumption of the BLDC motor 108. For example, while driving the motor at the second commutation, the controller 114 receives and monitors power consumption signals indicating power consumption of the BLDC motor 108, such as, for example, power, current, and/or voltage draw (410). The controller 114 determines if the power consumption is below (or less than) a second threshold value (412).

When the power consumption is not below (or is greater than or equal to) the second threshold value, the method proceeds back to step 408, and the controller 114 continues to control the switching array to drive the motor at the second commutation (408).

When the power consumption is below (or less than) the second threshold value, the method proceeds back to step 402, and the controller 114 controls the switching array to drive the motor at the first commutation (402). In an embodiment, the second threshold value is less than the first threshold value. In another embodiment, the first and second threshold values are approximately the same value.

For example, when the BLDC motor 108 is running at maximum free speed, commutation is optimized to maximize the output speed of the BLDC motor 108. Once the controller 114 determines that the power consumption of the BLDC motor 108 increases past the first threshold, which indicates that the BLDC motor 108 may stall, the controller 114 changes the commutation to the second commutation to produce increased stall torque once the BLDC motor 108 actually stalls. The second commutation thereby provides improved torque performance for the overall tool 100. Once the power consumption decreases below the second threshold, which may be lower than the first threshold, the controller 114 changes the commutation back to the original commutation (i.e., first commutation). For example, the controller will change from the first commutation to the second commutation if the current is greater than or equal to 30 A (first threshold) and will then change back from the second commutation to the first commutation if the current is less than or equal to 20 A (second threshold).

In another embodiment, the controller 114 controls the switching array to drive the motor 108 at a third commutation when the controller detects that the rotor of the motor 108 is stopped/locked, such as when the tool 100 is trying to remove a tightened fastener. The third commutation may or may not be the same as the first or second commutations. Since the motor is in a static position, the controller 114 may use 6-step commutation without any additional phase advance or delay (other than what is needed to compensate for hall sensor misalignment with regards to the position of magnets in the motor 108). This is done because the motor 108 could remain in the same position for an extended period of time if the tool 100 cannot produce enough torque to break-free from the stopped/locked position. For this reason, the controller 114 will not be able to accurately determine when the next set of switching elements should be activated, thus the original set of switching elements will remain activated until another hall signal transition occurs. In an embodiment, the third commutation is optimized to maximize the output torque of the motor 108 from a resting/stopped state.

As discussed above, the aspects of the present invention are described in terms of a motorized ratchet tool, as shown. However, it should be understood that aspects of the present invention could be implanted in other hand tools. For example, and without limitation, the hand tool can be ratchet wrench, impact wrench, open wrench, screw driver, nut driver, drill, or any other tool capable of applying torque to a work piece and is powered by a BLDC motor. Additionally, the present invention could be used in implements where BLDC motors are used, for example, in servo, actuation, positioning, and variable speed applications where precise motion control and stable operation are critical.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A computer implemented method for controlling commutation of a brushless DC (BLDC) motor, the method comprising:
controlling a switching array to drive the BLDC motor at a first commutation;
receiving and monitoring power consumption signals indicating power consumption of the BLDC motor;
determining whether the power consumption exceeds a first threshold value;
controlling the switching array to drive the BLDC motor at a second commutation when the power consumption exceeds the first threshold value, wherein the second commutation includes a phase advance; and
controlling the switching array to cause the BLDC motor to drive at a third commutation when the BLDC motor is in a static position.

2. The method of claim 1, wherein the power consumption of the BLDC motor is current draw of the BLDC motor.

3. The method of claim 1, further comprising controlling the switching array to drive the BLDC motor at the first commutation when the power consumption is less than the first threshold value.

4. The method of claim 1, further comprising:
determining whether the power consumption is less than a second threshold value; and
controlling the switching array to drive the BLDC motor at the first commutation when the power consumption is less than the second threshold value.

5. The method of claim 4, wherein the second threshold value is less that the first threshold value.

6. The method of claim 4, wherein the second threshold value is equal to the first threshold value.

7. The method of claim 4, further comprising controlling the switching array to drive the BLDC motor at the second commutation when the power consumption is greater than the second threshold value.

8. The method of claim 1, wherein the second commutation is optimized to produce increased stall torque when the BLDC motor stalls.

9. The method of claim 1, wherein the first commutation is optimized to minimize power consumption or maximize output speed of the BLDC motor.

10. A power tool including an output and a brushless DC (BLDC) motor adapted to drive the output, comprising:
a switching array adapted to selectively apply power from a power source to the BLDC motor; and
a controller adapted to:
control the switching array to drive the BLDC motor at a first commutation;
receive and monitor power consumption signals indicating power consumption of the BLDC motor;
determine whether the power consumption exceeds a first threshold value;
control the switching array to drive the BLDC motor at a second commutation when the power consumption exceeds the first threshold value, wherein the second commutation includes a phase advance; and
control the switching array to cause the BLDC motor to drive at a third commutation when the BLDC motor is in a static position.

11. The power tool of claim 10, wherein the controller is further adapted to control the switching array to drive the BLDC motor at the first commutation when the power consumption is less than the first threshold value.

12. The power tool of claim 10, wherein the controller is further adapted to:
determine whether the power consumption is less than a second threshold value; and
control the switching array to drive the BLDC motor at the first commutation when the power consumption is less than the second threshold value.

13. The power tool of claim 12, wherein the controller is further adapted to control the switching array to drive the BLDC motor at the second commutation when the power consumption is greater than the second threshold value.

14. The power tool of claim 12, wherein the second threshold value is less that the first threshold value.

15. The power tool of claim 12, wherein the second threshold value is equal to the first threshold value.

16. The power tool of claim 10, wherein the power consumption of the BLDC motor is current draw of the BLDC motor.

17. The power tool of claim 10, wherein the second commutation is optimized to produce increased stall torque when the BLDC motor stalls.

18. The power tool of claim 10, wherein the first commutation is optimized to minimize power consumption or maximize output speed of the BLDC motor.

19. A controller for controlling a switching array that selectively applies power from a power source to implement commutation of a brushless DC (BLDC) motor, comprising:
a memory including non-transitory computer-readable instructions; and
a processor adapted to execute the non-transitory computer-readable instructions to cause the processor to:
control the switching array to cause the BLDC motor to drive at a first commutation;
receive and monitor power consumption signals indicating power consumption of the BLDC motor;
determine whether the power consumption exceeds a first threshold value;
control the switching array to cause the BLDC motor to drive at a second commutation when the power consumption exceeds the first threshold value, wherein the second commutation includes a phase advance; and
control the switching array to cause the BLDC motor to drive at a third commutation when the BLDC motor is in a static position.

20. The controller of claim 19, wherein the processor is further adapted to control the switching array to cause the BLDC motor to drive at the first commutation when the power consumption is less than the first threshold value.

21. The controller of claim 19, wherein the processor is further adapted to:
   determine whether the power consumption is less than a second threshold value; and
   control the switching array to cause the BLDC motor to drive at the first commutation when the power consumption is less than the second threshold value.

22. The controller of claim 21, wherein the processor is further adapted to control the switching array to cause the BLDC motor to drive at the second commutation when the power consumption is greater than the second threshold value.

23. The controller of claim 21, wherein the second threshold value is less than the first threshold value.

24. The controller of claim 21, wherein the second threshold value is equal to the first threshold value.

25. The controller of claim 19, wherein the power consumption of the BLDC motor is current draw of the BLDC motor.

26. The controller of claim 19, wherein the second commutation is optimized to produce increased stall torque when the BLDC motor stalls.

27. The controller of claim 19, wherein the first commutation is optimized to minimize power consumption or maximize output speed of the BLDC motor.

28. The controller of claim 19, wherein the third commutation is the same as one of the first and second commutations.

29. The controller of claim 19, wherein the third commutation is optimized to maximize torque of the BLDC motor from a stopped state.

* * * * *